Patented Feb. 6, 1951

2,540,826

UNITED STATES PATENT OFFICE 2,540,826

PROCESS FOR PRODUCING 4-AMINO-PYRIMIDINES

Arthur W. Larchar, Mendenhall, Pa., assignor to E. I. du Pont de Nemours & Company, Wilmington, Del., a corporation of Delaware No Drawing. Application July 10, 1948, Serial No. 38,161

8 Claims. (Cl. 260—256.4)

This invention relates to a novel method for preparing aminopyrimidines.

The preparation of 4-aminopyrimidines by heating a nitrile in the presence of alkaline condensing agents has been described by numerous investigators. Without exception, these prior workers have used large amounts of the condensing agent, frequently in an amount molecularly equivalent to the nitrile used, i. e., one mole of condensing agent for each mole of nitrile. Thus, the recommended procedure for preparing 4-amino-2,6-dimethylpyrimidine, as described by Ronzio and Cook, Organic Syntheses, 24, 6 (1944), involves the use of 70 grams of potassium methoxide condensing agent and 41 grams of acetonitrile. The methods of the prior art, employing large quantities of alkaline condensing agents, have given yields of the order of 35 to 65 per cent but in no case greater than 70 per cent.

This invention has as an object the preparation of 4-aminopyrimidines. A further object is the provision of an improved process for the preparation of this class of compounds. Another object is the obtaining of improved yields of these compounds. A still further object is an economy in the preparation of these compounds. Other objects will appear hereinafter.

These objects are accomplished by the following invention wherein a 4-aminopyrimidine is prepared by heating a nitrile in which the cyano group is attached to a carbon bearing at least two hydrogens at 100–200° C. in the presence of but catalytic amounts, i. e., 0.005 to 0.05 mole, per mole of nitrile, of an alkali metal alkoxide.

The application of the invention to acetonitrile gives 4-amino-2,6-dimethylpyrimidine according to the equation:

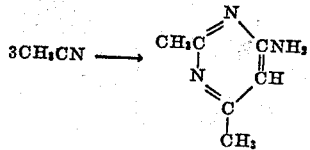

The invention is illustrated in the following examples wherein, unless otherwise specified, parts are by weight and degrees are on the centigrade scale.

Example I

An autoclave was filled to approximately half of its capacity with a mixture of 196 parts of acetonitrile and four parts of sodium methoxide. The autoclave was heated at 150° for twelve hours, with agitation by rocking. The crude product, a yellow solid, was codistilled with approximately 1500 parts of kerosene. From the distillate there was separated by filtration 4-amino-2,6-dimethylpyrimidine as a white, crystalline solid melting at 182–183°. The conversion was 86% (168 parts of pure product).

That the product formed is 4-amino-2,6-dimethylpyrimidine was established by running a mixed melting point with an authentic sample of 4-amino-2,6-dimethylpyrimidine obtained from another source. The mixture melted at 182–183°. The melting point of 4-amino-2,6-dimethylpyrimidine, as given by Schmidt, Ber. 35, 1575 (1902), is 183°.

The product obtained from a run identical with that of Example I, but using 10 times as much acetonitrile and sodium methoxide, was further identified as 4-amino-2,6-dimethylpyrimidine by conversion to the corresponding N-acetyl derivative by reaction with acetic anhydride. The product, (4-acetamino-2,6-dimethylpyrimidine), melted at 188–189°, a melting point identical with that of the acetyl derivative obtained from an authentic sample of 4-amino-2,6-dimethylpyrimidine. Pinner, Ber. 17, 174 (1884) reports a melting point of 185° for this compound.

Example II

An autoclave was filled to approximately half of its capacity with a mixture of 196 parts of propionitrile and 4 parts of sodium methoxide. The autoclave was heated at 150° for twelve hours, with agitation by rocking. The crude product was filtered from the reaction mixture, heated with approximately 200 parts of water, cooled and filtered again. 4-amino-2,6-diethyl-5-methylpyrimidine was obtained as a white crystalline solid melting at 186–189°. The yield was 68% (116 parts). From the original filtrate 26 parts of propionitrile were recovered by distillation.

In a similar manner other nitriles can be converted into 4-aminopyrimidines. For example, use of butyronitrile gives 4-amino-2,6-di-n-propyl-5-ethylpyrimidine; use of isovaleronitrile gives 4-amino-2,6-diisobutyl-5-isopropylpyrimidine; use of isocapronitrile gives 4-amino-2,6-diisoamyl-5-isobutylpyrimidine; the use of phenylacetonitrile gives 4-amino-2,6-dibenzyl-5-phenylpyrimidine. Long chain nitriles, such as stearonitrile; and bifunctional nitriles, such as adiponitrile and ethylenecyanhydrin, can also be employed. The invention can also be applied to mixtures of nitriles, e. g., a mixture of acetonitrile and propionitrile or a mixture of benzonitrile and propionitrile. When using a mixture of nitriles only one of the nitriles need contain the —CH₂CN group. The preferred nitriles are mononitriles, particularly those of formula RCH₂CN wherein R is hydrogen or a monovalent, saturated hydrocarbon radical, i. e., nitriles having a —CH₂CN group and being, apart from the CN group, saturated aliphatic hydrocarbon.

The condensing agents used in the process of this invention are alkali alkoxides and any alkali metal alkoxide may be used. The preferred alkali metal alkoxides are those derived from monohydric alkanols containing up to 5 carbon atoms. Examples of suitable agents of this type are sodium, potassium, and lithium methoxides, ethoxides, propoxides, and butoxides. Other alkaline condensing agents, e. g., sodamide, sodium hydroxide, potassium hydroxide, ammonia and piperidine, can be used to obtain 4-aminopyrimidines but require more drastic conditions or give large amounts of by-product. Thus, in the case of acetonitrile and ammonia at 150° C. a pressure of at least 4,000 atmospheres is required to obtain significant conversions to the 4-aminopyrimidine.

The main advantages of the process of the present invention over prior processes are that much less condensing agent is used and that purification is simplified since there are fewer by-products. The yields are also higher. The overall advantage is, therefore, one of economy.

The 4-aminopyrimidines obtainable by the process of this invention can be used as intermediates in the preparation of dyes, bactericides and resins.

The foregoing detailed description has been given for clearness of understanding only and no unnecessary limitations are to be understood therefrom. The invention is not limited to the exact details shown and described for obvious modifications will occur to those skilled in the art.

What is claimed is:

1. In the preparation of 4-aminopyrimidines by heating a nitrile having a cyano, —CN, group attached to a —CH₂— group with an alkaline condensing agent, the improvement wherein the nitrile is heated with from 0.005 to 0.05 mole, per mole of nitrile, of an alkali metal alkoxide and the 4-aminopyrimidine is recovered.

2. In the preparation of 4-aminopyrimidines by heating a nitrile having a cyano, —CN, group attached to a —CH₂— group with an alkaline condensing agent, the improvement wherein the nitrile is heated with from 0.005 to 0.05 mole, per mole of nitrile, of sodium methoxide and the 4-aminopyrimidine is recovered.

3. In the preparation of 4-amino-2,6-dimethylpyrimidine by heating acetonitrile with an alkaline condensing agent, the improvement wherein the acetonitrile is heated with from 0.005 to 0.05 mole, per mole of acetonitrile, of an alkali metal alkoxide and the 4-amino-2,6-dimethylpyrimidine is recovered.

4. In the preparation of 4-amino-2,6-dimethylpyrimidine by heating acetonitrile with an alkaline condensing agent, the improvement wherein the acetonitrile is heated with from 0.005 to 0.05 mole, per mole of acetonitrile, of sodium methoxide and the 4-amino-2,6-dimethylpyrimidine is recovered.

5. In the preparation of 4-aminopyrimidines by heating a nitrile having a cyano, —CN, group attached to a —CH₂— group with an alkaline condensing agent, the improvement wherein the nitrile is heated with about 2% by weight of alkali metal alkoxide and the 4-aminopyrimidine is recovered.

6. In the preparation of 4-aminopyrimidines by heating a nitrile RCH₂CN where RCH₂ is an alkyl group with an alkaline condensing agent, the improvement wherein the nitrile is heated with about 2% by weight of alkali metal alkoxide and the 4-aminopyrimidine is recovered.

7. In the preparation of 4-amino-2,6-dimethylpyrimidine by heating acetonitrile with an alkaline condensing agent, the improvement wherein the acetonitrile is heated with about 2% by weight of alkali metal alkoxide and the 4-amino-2,6-dimethylpyrimidine is recovered.

8. In the preparation of 4-amino-2,6-diethyl-5-methylpyrimidine by heating propionitrile with an alkaline condensing agent, the improvement wherein the propionitrile is heated with from 0.005 to 0.05 mole, per mole of propionitrile, of an alkali metal alkoxide and the 4-amino-2,6-diethyl-5-methylpyrimidine is recovered.

ARTHUR W. LARCHAR.

REFERENCES CITED

The following references are of record in the file of this patent:

Wache: J. prakt. Chem. 39 245 (1889).
Schwarze: J. prakt. Chem. 42 3 (1890).
Herfeldt: J. prakt. Chem. 53 246 (1896).